US007460556B2

(12) United States Patent
Duggirala et al.

(10) Patent No.: US 7,460,556 B2
(45) Date of Patent: Dec. 2, 2008

(54) AUTONOMIC ADJUSTMENT OF CONNECTION KEEP-ALIVES

(75) Inventors: Surya V. Duggirala, Eagan, MN (US); Matthew Ara Goshgarian, Rochester, MN (US); Niharika Sudhir Joglekar, East Lansing, MI (US); Bhushan Kamlakar Lokhande, Rochester, MN (US); Robert Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 11/060,358

(22) Filed: Feb. 17, 2005

(65) Prior Publication Data

US 2006/0182141 A1 Aug. 17, 2006

(51) Int. Cl.
*H04J 3/16* (2006.01)
(52) U.S. Cl. ...................... 370/465; 709/224
(58) Field of Classification Search ............... 370/328, 370/395.1, 465, 295.1; 709/223, 224, 227
See application file for complete search history.

(56) References Cited

U.S. PATENT DOCUMENTS

| 6,330,602 | B1 | 12/2001 | Law et al. | |
|---|---|---|---|---|
| 6,438,597 | B1 | 8/2002 | Mosberger et al. | |
| 2003/0128676 | A1* | 7/2003 | Lee | 370/328 |
| 2003/0158930 | A1* | 8/2003 | Mc Bride | 709/223 |
| 2004/0008682 | A1* | 1/2004 | Miriyala | 370/395.1 |
| 2006/0031520 | A1 | 2/2006 | Bedekar et al. | |

FOREIGN PATENT DOCUMENTS

| EP | 1478122 A2 | 11/2004 |
|---|---|---|
| EP | 1569404 A1 | 8/2005 |
| WO | 0031942 A2 | 6/2000 |

OTHER PUBLICATIONS

Yang, Chu-Sing et al, "Building an Adaptable, Fault Tolerant, and Highly Manageable Web Server on Clusters of Non-Dedicated Workstations", Proceedings of the 2000 International Conference on Parallel Processing, Toronto, Ontario, Canada, Aug. 21-24, 2000, pp. 413-420.

* cited by examiner

*Primary Examiner*—Chirag G Shah
*Assistant Examiner*—Yong Zhou
(74) *Attorney, Agent, or Firm*—Martin & Associates, LLC; Derek P. Martin

(57) ABSTRACT

A server computer system includes a keep-alive autonomic adjustment mechanism that monitors current operating conditions and dynamically adjusts the keep-alive specification to optimize the keep-alives for the current operating conditions. The keep-alive autonomic adjustment mechanism monitors the total number of clients, and the average number of requests per client. The value of a keep-alive specification that determines how log to keep a connection open may be dynamically and autonomically adjusted by the keep-alive autonomic adjustment mechanism according to the monitored current operating conditions. The keep-alive autonomic adjustment mechanism may also include the ability to autonomically enable and disable the keep-alives. In this manner the performance of the server may be tuned to optimize the effect of using keep-alives according to current operating conditions.

1 Claim, 4 Drawing Sheets

| Measurement | Unique Users | Requests/User | Classification |
|---|---|---|---|
| 1 | 5 | 1 | Few Clients, Few Requests |
| 2 | 10,000 | 1 | Many Clients, Few Requests |
| 3 | 2,000 | 10 | Many Clients, Many Requests |
| 4 | 10 | 1,500 | Few Clients, Many Requests |

600

610
620
630
640

AUTONOMIC ADJUSTMENT OF CONNECTION KEEP-ALIVES

BACKGROUND OF THE INVENTION

1. Technical Field

This invention generally relates to computer systems, and more specifically relates to connections for communicating between computer systems.

2. Background Art

Many computer systems today are highly networked to provide a variety of different computing services. For example, client computer systems may connect to server computer systems to request certain services hosted by the server computer systems. When a user uses a web browser to request a web page, the user's computer system typically sends a request for the web page, which causes the web server that hosts the web page to deliver the requested web page to the user's web browser.

Hypertext transfer protocol (HTTP) was developed to allow for transmission of data between computer systems. In the original HTTP version 1.0 specification, a client computer system has to establish a connection known as a socket with a server computer system for each object or component to be transferred. With an early web page that only had, for example, three components, the overhead of opening a different connection to transfer each of the three components was not terribly significant. However, modern web pages may have a large number of different components. The overhead of opening and closing a connection for each component on a web page becomes a significant drain on the resources of web server computer systems.

To help alleviate this problem, the concept of an HTTP keep-alive was developed, and was put into the HTTP version 1.1 specification. A client (such as a web browser) may inform the server with a web page request that the client supports keep-alives. In response, the server may tell the client that the connection will be kept alive so that multiple components may be transferred over the same connection. For example, by keeping the connection open, multiple images on a web page may be transferred on the same connection when the connection is kept alive. A keep-alive specification may specify a timeout period for the connection in either time units or in the number of objects transferred across the connection. Once the specification is satisfied, the connection is closed by the server.

The general concept of HTTP keep-alives is very useful at reducing overhead on web server computer systems in many circumstances. However, the usefulness of keep-alives depends largely upon the volume and type of work the server is performing, and the keep-alive specification. The enablement of keep-alives is typically performed at a global level on the web server, which means that they are either manually turned on or manually turned off. In some cases, the keep-alives may actually reduce server performance. Without a way to dynamically enable, disable, and adjust the settings of connection keep-alives, the computer industry will continue to suffer from less-than-optimal performance in a web server that uses connection keep-alives.

DISCLOSURE OF INVENTION

According to the preferred embodiments, a server computer system includes a keep-alive adjustment mechanism that monitors current operating conditions and dynamically adjusts the keep-alive specification to optimize the keep-alives for the current operating conditions. The keep-alive adjustment mechanism monitors the total number of clients, and the average number of requests per client. There are four distinct cases that represent very different operating environments for which the keep-alive specification may be dynamically adjusted, namely: few clients and few requests per client; many clients and few requests per client; few clients and many requests per client; and many clients and many requests per client. When the server has few clients and few requests per client, the keep-alive adjustment mechanism may disable keep-alives, or may set the keep-alive specification to some predetermined value. When the server has many clients and few requests per client, the keep-alive adjustment mechanism sets the keep-alive specification to a minimal value. When the server has few clients but many requests per client, the keep-alive adjustment mechanism sets the keep-alive specification to its maximum value. When the server has many clients and many requests per client, the keep-alive adjustment mechanism sets the keep-alive specification somewhere in its midrange of values. The keep-alive adjustment mechanism may also include the ability to automatically enable and disable the keep-alives. In this manner the performance of the server may be tuned to optimize the effect of using keep-alives according to current operating conditions.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 2:
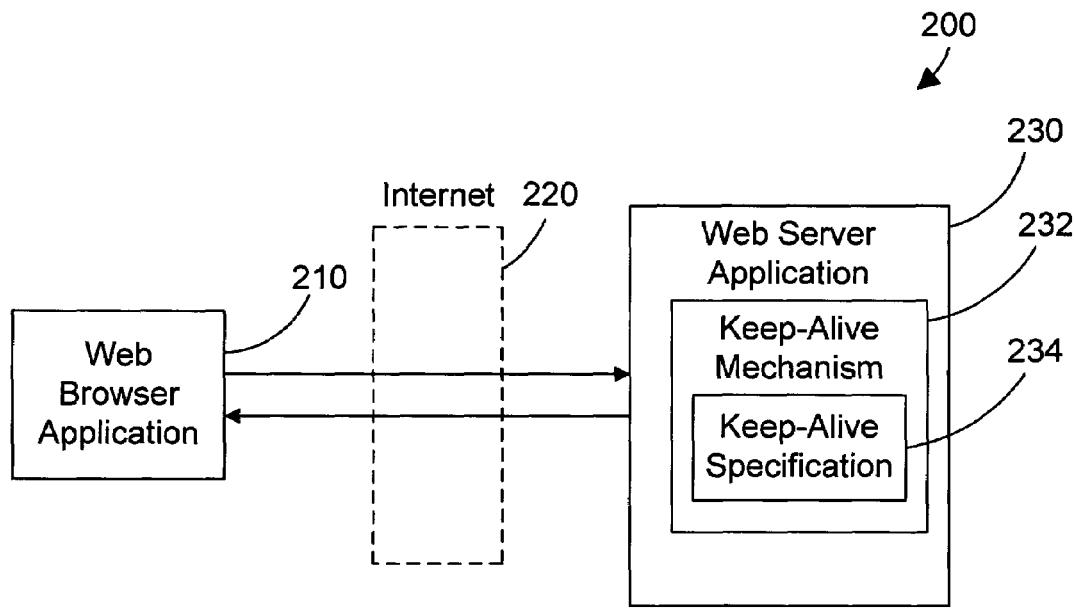
FIG. 2 is a block diagram of a prior art system showing interaction between software components via the Internet.

Connection keep-alives are known in the art. Referring to FIG. 2, one sample system 200 is shown to illustrate a known keep-alive mechanism. A web browser application 210 connects via a network such as the Internet 220 to a web server application 230. The web server application 230 includes a keep-alive mechanism 232 that functions to keep one or more connections alive for multiple objects according to a keep-alive specification 234. If the web browser application 210 supports keep-alives, the request from web browser application 210 to web server application 230 will so indicate. In response, the web server application 230 has the option of keeping the connection alive, and passing multiple objects over one connection. If the web server application 230 decides to keep a connection alive for multiple objects, the keep-alive mechanism 232 monitors the connection, and closes the connection according to a specified keep-alive specification 234. One simple example of the keep-alive specification 234 is a time period. Thus, if the keep-alive specification 234 is specified to be 50 milliseconds (ms), the keep-alive mechanism 232 will keep a connection alive for 50 ms, then shut the connection down. Another example of a suitable keep-alive specification 234 is the number of objects to transfer. Thus, if the keep-alive specification 234 is specified to be 20 objects, the keep-alive mechanism 232 will keep a connection alive until 20 objects have been transferred, then shut the connection down. With modern web pages that contain a high number of objects, keeping a connection alive can dramatically improve system performance. However, the presence of keep-alives can also decrease system performance in some circumstances.

One specific case where the use of keep-alives may be detrimental to system performance can be seen with the WebSphere Application Server (WAS) version 5.1 by IBM Corporation. In WAS v5.1, there is a one-to-one correlation between sockets that hold HTTP connections and threads within the server runtime. If the server is configured to hold keep-alives open for too long and the requests on that connection are sporadic enough, we can easily reach a scenario where most threads are sitting idle waiting for new requests on their open connections and other requests are waiting to get a connection. This can only be remedied by the addition of threads to the runtime, which has a very low upper bound before scheduling issues and resource contention start showing diminishing returns.

The preferred embodiments solve the problems in the art by providing a connection keep-alive autonomic adjustment mechanism that autonomically adjusts a keep-alive specification according to monitored operating conditions. The connection keep-alive adjustment mechanism is "autonomic" due to its ability to automatically adjust the keep-alive specification without user intervention. By autonomically adjusting the performance of keep-alives according to monitored conditions, the preferred embodiments allow tuning the keep-alives for maximum performance. The keep-alive autonomic adjustment mechanism may also dynamically enable and disable keep-alives.

Figure 1:
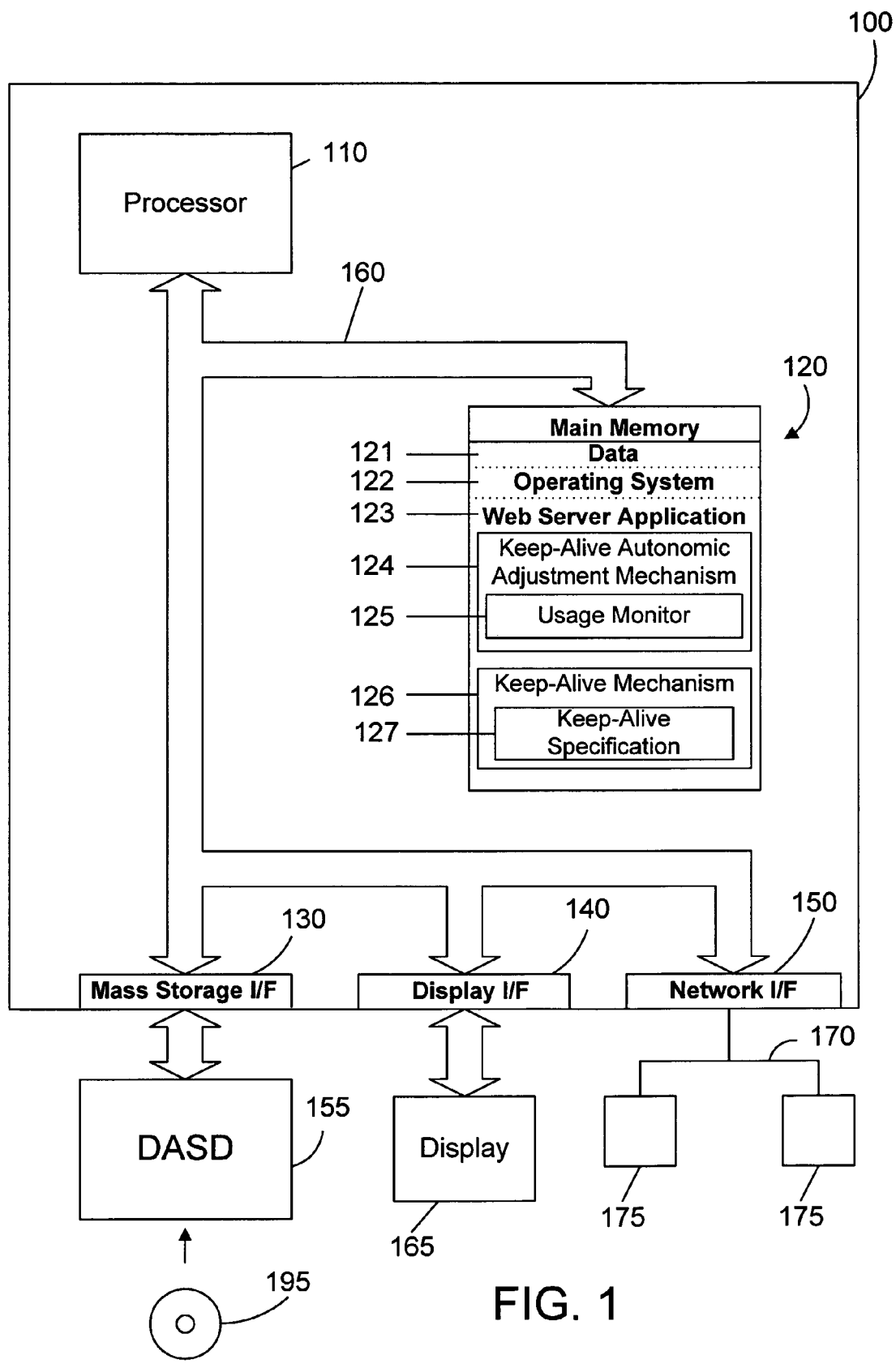
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system that serves as a web server. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, and a web server application 123. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Web server application 123 services requests from clients for which the web server application 123 has responsibility. Web server application 123 is shown in FIG. 1 as one suitable example of a server application within the scope of the preferred embodiments. Web server application 123 includes a keep-alive autonomic adjustment mechanism 124 and a keep-alive mechanism 126. The keep-alive autonomic adjustment mechanism 124 includes a usage monitor 125 that detects current operating conditions for the computer system 100. Usage monitor 125 preferably detects the number of clients accessing the web server application 123, and the average number of requests per client over a defined time period. The keep-alive autonomic adjustment mechanism 124 uses the usage monitor 125 to detect current operating conditions, and in response thereto, may adjust the keep-alive specification 127. In one specific embodiment, the keep-alive autonomic adjustment mechanism 124 may also autonomically enable and disable keep-alives based on current operating conditions.

The keep-alive mechanism 126 keeps a connection open according to the keep-alive specification 127. As stated above with reference to FIG. 2, known keep-alive specifications include a time period and a number of requests. The keep-alive specification 127 of the preferred embodiments expressly extends to any and all ways of specifying duration and/or performance for a keep-alive mechanism, whether currently known or developed in the future. For example, one suitable keep-alive specification 127 may specify an average number of bits per time period that must be maintained in order for the connection to remain open.

Note that one suitable implementation for keep-alive mechanism 126 is the prior art keep-alive mechanism 232 shown in FIG. 2. In this specific implementation, the keep-alive specification 127 is the same as the prior art keep-alive specification 234 shown in FIG. 2. Note, however, that it is equally within the scope of the preferred embodiments for the keep-alive mechanism 126 and keep-alive specification 127 to have different or additional function when compared to the prior art keep-alive mechanism 232 and keep-alive specification 234, respectively. In addition, FIG. 1 shows the keep-alive autonomic adjust mechanism 124 as being separate from the keep-alive mechanism 126 that keeps the connections alive. However, one skilled in the art will realize that the functions of the keep-alive autonomic adjustment mechanism 124 and the keep-alive mechanism 126 could be implemented in the same computer program.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and web server application 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 3:
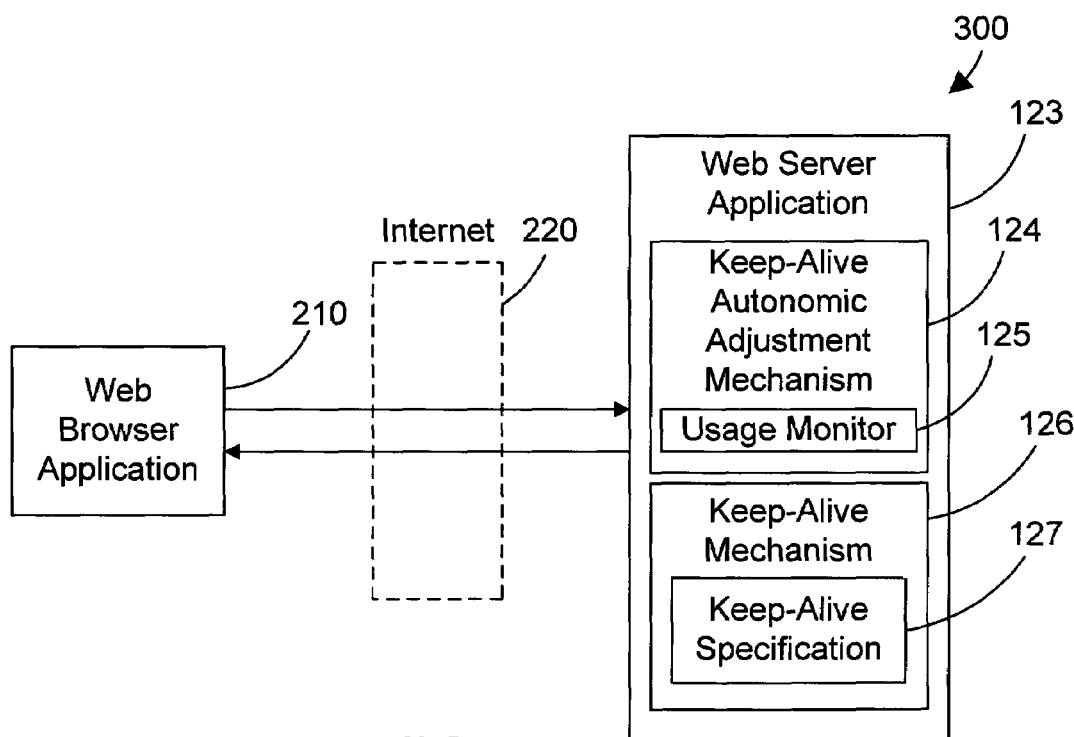
FIG. 3 is a block diagram of a system that dynamically adjusts connection keep-alives in accordance with the preferred embodiments.

Referring now to FIG. 3, a system 300 in accordance with the preferred embodiments shows the relationship between software elements in FIG. 1 in a way that allows easy comparison with the prior art system 200 shown in FIG. 2. A web browser application 210 connects via a network such as Internet 220 to a web server application 123 of the preferred embodiments. The keep-alive autonomic adjustment mechanism 124 uses the usage monitor 125 to determine current operating conditions for the web server application 123, then dynamically sets the keep-alive specification 127 to most optimally accommodate the current operating conditions. In a first embodiment, keep-alives are manually enabled, and the keep-alive autonomic adjustment mechanism 124 dynamically adjusts the keep-alive specification according to the current operating conditions as detected by the usage monitor 125. In a second embodiment, the keep-alive autonomic adjustment mechanism 124 may autonomically enable and disable the keep-alive mechanism 126 in addition to autonomically adjusting the keep-alive specification 127. In this manner keep-alives may be disabled if the current operating conditions so warrant. The function of the keep-alive autonomic adjustment mechanism 124 of the preferred embodiments is shown by specific examples illustrated in FIGS. 4-7.

The apparatus and methods of the preferred embodiments provide a way to tune keep-alive settings according to changing operating conditions. This is a significant advance over the prior art, which globally enables or disables keep-alives, and when enabled, uses a single keep-alive specification regardless of the current operating conditions of the server.

Figure 4:
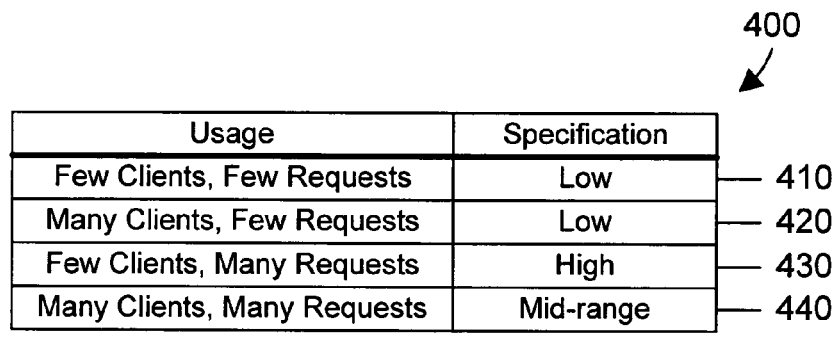
FIG. 4 is a table showing a first specific way to dynamically adjust connection keep-alives in accordance with the preferred embodiments.

A few examples will illustrate the need for the ability to dynamically tune the keep-alive settings to maximize system performance. Referring to FIG. 4, a table 400 represents different operating conditions that may affect the autonomic adjustment of keep-alives in the preferred embodiments. We assume for this first specific embodiment illustrated in FIG. 4 that keep-alives have been manually, globally enabled on the web server. First, we consider the case of few clients and few requests per client in row 410 of FIG. 4. In this case, the load on the server is very light, so any performance enhancement provided by enabling keep-alives would be minimal. As a result, the keep-alive specification is set to low value. The case of many clients and few requests per client in row 420 of FIG. 4 is illustrative of a typical retail website, where many clients may be connected at one time, but due to the time required to read and browse web pages, the number of requests per client is relatively low. In this case, the keep-alive autonomic adjustment mechanism 124 realizes that the keep-alive specification 127 should be minimized so connections (and corresponding threads) are not kept alive for too long when there is not a sufficient number of requests per connection to justify keeping the connection open. As a result, the keep-alive specification in FIG. 4 is set to a low value, as shown in row 420.

The case of few clients and many requests per client in row 430 of FIG. 4 is illustrative of a business-to-business (B2B) environment, where few clients may each make many requests. In this case, the usefulness of keep-alives is at its highest, because the longer the keep-alive period, the higher the number of object that may be transferred on a single connection. As a result, the keep-alive specification is set to a relatively high value, as shown in row 430 of FIG. 4.

The case of many clients and many requests illustrates the scenario of a web server that is very busy. This could happen, for example, when there is a surge in a B2B channel. Autonomic tuning is even more key in this case in order to reach optimum performance. In this case, the keep-alive specification would be in the midrange. This value will change autonomically as the operating conditions change.

We now consider a second specific embodiment that allows the keep-alive autonomic adjustment mechanism to dynamically and autonomically enable and disable keep-alives as required. This is shown in table 500 of FIG. 5. In the case of few clients and few requests per client in row 510 of FIG. 5, the load on the server is very light, so any performance enhancement provided by enabling keep-alives would be minimal. As a result, the keep-alive autonomic adjustment mechanism 124 could disable keep-alives, as shown in row 510 of FIG. 5. If the keep-alive mechanism is disabled, the keep-alive specification has no effect on the performance of the server application.

Figure 5:
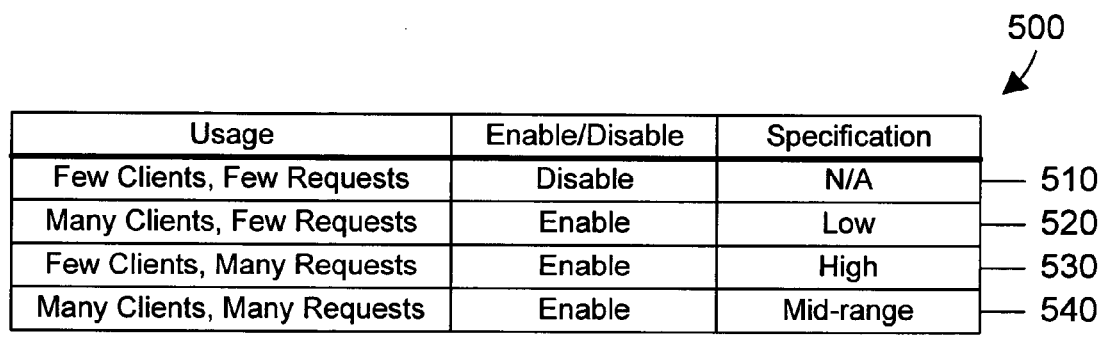
FIG. 5 is a table showing a second specific way to dynamically enable, disable, and adjust connection keep-alives in accordance with the preferred embodiments.

Once the number of clients exceeds a first threshold, or the number of requests per client exceeds a second threshold, the keep-alive autonomic adjustment mechanism enables the keep-alive mechanism, as shown in rows 520, 530 and 540 of FIG. 5. Note that the specification in rows 520, 530 and 540 may be set to similar values as 420, 430, and 440, respectively, in FIG. 4.

Figures 6, 7:
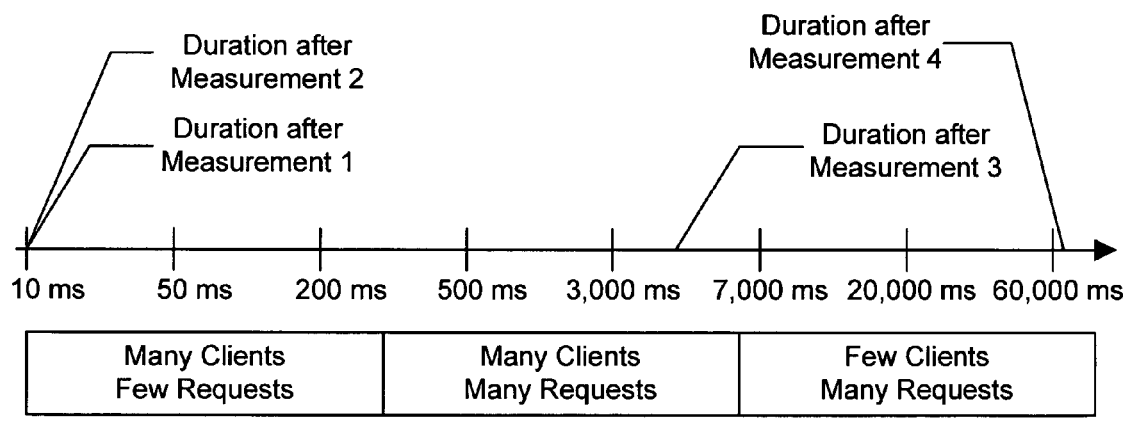
FIG. 6 is a table showing four measurements by the usage monitor 125 in FIGS. 1 and 3 that results in the keep-alive duration being set to the values shown in FIG. 7.
FIG. 7 is a diagram that graphically shows the dynamic setting of keep-alive duration in accordance with the preferred embodiments.

A simple example will now illustrate the elegance and power of a server application of the preferred embodiments. Referring to FIG. 6, a table 600 illustrates operating conditions that could be monitored by the usage monitor 125 of FIGS. 1 and 3. We assume for the sake of illustration that a first threshold of 100 is selected, below which is deemed to be few clients and equal to or above which is deemed to be many clients. We further assume for the sake of illustration that a second threshold of 5 is selected, below which is deemed to be few requests per client and equal to or above which is deemed to be many requests per client. We further assume that four different measurements are taken, with each representing one of the four cases shown in FIGS. 4 and 5. In measurement 1, shown in row 610 of FIG. 6, there are five clients and an average of one request per client. This corresponds to few clients and few requests, according to the first and second thresholds described above. In measurement 2, shown in row 620 of FIG. 6, there are 10,000 clients and one request per client. This corresponds to many clients and few requests. In measurement 3, shown in row 630 of FIG. 6, there are 2,000 clients and 10 requests per client. This corresponds to many clients and many requests. In measurement 4, shown in row 640 of FIG. 6, there are 10 clients and 1,500 requests per client. This corresponds to few clients and many requests.

FIG. 7 illustrates how the measurements shown in FIG. 6 may be used to autonomically adjust a keep-alive specification. We assume for the sake of illustration that the keep-alive specification is specified as a time period. In the case of the first specific embodiment herein, where keep-alives are manually and globally enabled and disabled, we assume that the keep-alives have been manually and globally enabled. This means that the keep-alive autonomic adjustment mechanism does not disable keep-alives, but merely adjusts the value of the keep-alive specification. This is illustrated in FIG. 4. After taking measurement 1, the keep-alive autonomic adjustment mechanism determines that the measured (or monitored) performance corresponds to few clients and few requests. As a result, the value of the keep-alive specification is set to its minimum value of 10 ms, as shown in FIG. 7. In the alternative, in the second specific embodiment represented in FIG. 5, the keep-alive autonomic adjustment mechanism disables keep-alives after measurement 1 instead of setting the keep-alive specification to some medium-low value. After measurement 2, the keep-alive autonomic adjustment mechanism determines that the measured performance corresponds to many clients and few requests, and sets the keep-alive specification to its minimum value of 10 ms, as shown in FIG. 7. After measurement 3, the keep-alive autonomic adjustment mechanism determines that the measured performance corresponds to many clients and many requests, and sets the keep-alive specification to a mid-range value as shown in FIG. 7. After measurement 4, the keep-alive autonomic adjustment mechanism determines that the measured performance corresponds to few clients and many requests per client, and sets the keep-alive specification to a high value, as shown in FIG. 7. In the second specific embodiment illustrated in FIG. 5, the keep-alive autonomic adjustment mechanism also enables the keep-alives after each of measurements 2, 3 and 4.

The example shown in FIGS. 6 and 7 is very simplified to illustrate the preferred embodiments. The assumption of two fixed thresholds to determine many or few clients or requests per client could use sliding or relative thresholds that indicate relative load. In addition, FIG. 7 shows that the adjustment of the keep-alive specification could have very fine granularity along a sliding scale. This allows fine-tuning the keep-alive specification to optimize the performance of the server application. The scale shown at the bottom of FIG. 7 shows how the keep-alive specification may be adjusted from a low level, representative of many clients and few requests, to a mid-range level, representative of many clients and many requests, to a high level, representative of few clients and many requests. While the scale at the bottom of FIG. 7 does not explicitly include few clients and few requests, this is the case of a lightly loaded server where keep-alives have the least impact on performance. For this reason, the keep-alive specification could be set to some predetermined value (first embodiment), or could be disabled altogether (second embodiment).

Note that the operational conditions monitored by the usage monitor 125 preferably include the number of clients and the average number of requests per client. This information is available from performance metrics for the HTTP service itself. For example, the usage monitor 125 may determine the maximum number of concurrent requests for some defined period and the average number of requests per second per client (i.e., the rate at which the average client is sending requests). These parameters may be tracked by use of exponential moving averages in order to make the calculations optimal as well as introduce a smoothing factor to the learning algorithm in the form of the window size of the average. The value of the smoothing factor can be set in relation to the severity of the performance impact for poorly-tuned keep-alives. When the severity is high, such that clients may be denied service if the keep-alive settings cause all threads in the runtime to be utilized for few inactive clients, the smoothing factor would be set such that a reaction to the change in request profile would be swift. This could be done, for example, by making a small window size for the moving averages. In cases where the impact for poorly-tuned keep-alives is less severe, a larger window size could be used to provide a keep-alive specification that changes more slowly to avoid thrashing within the system.

The preferred embodiments provide a way to autonomically and dynamically adjust a keep-alive specification to tune the performance of a computer system according to current operating conditions. The dynamic tuning of connection keep-alives allow a server computer system of the preferred embodiments to optimize its keep-alive settings to achieve the best performance possible that is tuned to the current operating conditions.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments discussed herein assume a single keep-alive specification, it is within the scope of the preferred embodiments to define multiple keep-alive specifications and to autonomically adjust any or all of these multiple keep-alive specifications according to current operating conditions.

What is claimed is:

1. A computer-implemented method for a server application to manage connection keep-alives, the method comprising the steps of:
   (A) enabling a keep-alive mechanism that keeps a connection to a client open according to a defined keep-alive specification;
   (B) monitoring number of clients and average number of requests per client for the server application;
   (C) automatically enabling the keep alive mechanism when the number of clients is in excess of a first predetermined threshold;
   (D) automatically enabling the keep alive mechanism when the number of requests per client is in excess of a second predetermined threshold;
   (E) automatically disabling the keep alive mechanism when the number of clients is below the first predetermined threshold and the average number of requests per client is below the second predetermined threshold;
   (F) setting the keep-alive specification to a minimal value when the number of clients is above the first predetermined threshold and the average number of requests per client is below the second predetermined threshold;
   (G) setting the keep-alive specification to a maximum value when the number of clients is below the first predetermined threshold and the average number of requests per client is above the second predetermined threshold; and
   (H) setting the keep-alive specification to a midrange value between the minimal value and the maximum value when the number of clients is above the first predetermined threshold and the average number of requests per client is above the second predetermined threshold.

* * * * *